United States Patent
Bieder et al.

(10) Patent No.: US 10,100,167 B2
(45) Date of Patent: Oct. 16, 2018

(54) METHOD AND SYSTEM FOR PRODUCING A BINDER FOAM FOR PRODUCING ASPHALT

(71) Applicant: Ammann Schweiz AG, Langenthal (CH)

(72) Inventors: Andrea Bieder, Zürich (CH); Fritz Wälchli, Matzendorf (CH)

(73) Assignee: Ammann Schweiz AG, Langenthal (CH)

(*) Notice: Subject to any disclaimer, the term of this patent is extended or adjusted under 35 U.S.C. 154(b) by 534 days.

(21) Appl. No.: 14/650,784

(22) PCT Filed: Dec. 12, 2012

(86) PCT No.: PCT/CH2012/000273
§ 371 (c)(1),
(2) Date: Jun. 9, 2015

(87) PCT Pub. No.: WO2014/089712
PCT Pub. Date: Jun. 19, 2014

(65) Prior Publication Data
US 2015/0322228 A1    Nov. 12, 2015

(51) Int. Cl.
*C08J 9/28* (2006.01)
*C08L 95/00* (2006.01)
(Continued)

(52) U.S. Cl.
CPC .............. *C08J 9/28* (2013.01); *B05B 7/0018* (2013.01); *B05B 7/0075* (2013.01); *C08J 9/125* (2013.01);
(Continued)

(58) Field of Classification Search
CPC .... C08L 95/00; C08L 95/005; C08L 2555/00; C08L 2555/22; C08L 2555/24;
(Continued)

(56) References Cited

U.S. PATENT DOCUMENTS 3,254,045 A    5/1966   Sinclair
4,692,350 A *  9/1987   Clarke .................. E01C 19/174
                                                106/122
(Continued)

FOREIGN PATENT DOCUMENTS

| CN | 1587033 A | 3/2005 |
|---|---|---|
| CN | 102358849 A | 2/2012 |
| CN | 102444073 A | 5/2012 |
| CN | 102485913 A | 6/2012 |
| WO | 8702694 A1 | 5/1987 |
| WO | 0068302 A1 | 11/2000 |

(Continued)

OTHER PUBLICATIONS

International Search Report for PCT/CH2012/000273 dated Aug. 2, 2013.

(Continued)

*Primary Examiner* — Jennifer A Smith
*Assistant Examiner* — Alexandra M Moore
(74) *Attorney, Agent, or Firm* — McCormick, Paulding & Huber LLP

(57) ABSTRACT

The invention relates to a method for producing a binder foam for producing asphalt. In a pressurized stream of heated binder a liquid, which has a lower evaporation temperature under atmospheric pressure than the temperature of the heated binder stream is injected at an angle (α) of greater than 90° relative to the flow direction (S) of the binder stream such that a pressurized mixture stream of the binder with drops of liquid distributed therein or with drops of liquid distributed therein and vapor bubbles resulting from said drops is provided downstream of the injection point (D). The pressure of said mixture stream is then decreased whereby the binder is foamed as a result of an evaporation of the drops of liquid contained in the binder and/or as a result of the expansion of the vapor bubbles resulting from the drops of liquid.

18 Claims, 3 Drawing Sheets

(51) Int. Cl.
 *B05B 7/00* (2006.01)
 *C08J 9/12* (2006.01)
(52) U.S. Cl.
 CPC ........... *C08L 95/00* (2013.01); *C08J 2395/00* (2013.01); *C08L 2555/22* (2013.01); *C08L 2555/24* (2013.01); *C08L 2555/52* (2013.01)
(58) Field of Classification Search
 CPC ............ C08L 2555/52; C08L 2555/10; C08L 2555/20; C08L 2555/26; C08L 2555/28; C09D 195/00; C10C 3/00; C08J 9/28; C08J 9/30; C08J 9/35; C08J 11/00; C08J 2395/00; B05B 7/00; B05B 7/0018; B05B 7/0075; E01C 19/00; E01C 19/16; E01C 7/24; E01C 23/08; E01C 23/12; E01C 23/14; E01C 5/12; B05D 5/10
 See application file for complete search history.

(56) References Cited

U.S. PATENT DOCUMENTS 5,827,360 A    10/1998   Salminen
6,565,281 B2*   5/2003   Bruns ................. B05B 15/0208
                                                      239/118

FOREIGN PATENT DOCUMENTS

WO       2008023982 A2     2/2008

OTHER PUBLICATIONS

Chinese Office Action for corresponding Chinese Patent Application 201280078193.1 dated Sep. 9, 2016.
"Gas Combustion and Combustion Apparatus", Liu Rang, et al. China Machine Press, Aug. 31, 2009, pp. 52 and 53.

* cited by examiner

METHOD AND SYSTEM FOR PRODUCING A BINDER FOAM FOR PRODUCING ASPHALT

CROSS REFERENCE TO RELATED APPLICATIONS

This application claims the priority of PCT Application No. PCT/CH2012/000273, filed on Dec. 12, 2012, the disclosure of which is incorporated herein by reference in its entirety.

TECHNICAL FIELD

The invention relates to a method for producing a binder foam for asphalt production, particularly for producing foam bitumen, a method for producing asphalt with the binder foam produced with the method mentioned above, an installation for carrying out the first mentioned method as well as a use of the installation.

PRIOR ART

In order to reduce energy consumption and the $CO_2$-emission during production of asphalt, different technologies have been developed in the past years. One of these technologies is the reduction of the asphalt mixing temperature by using foamed bitumen. By foaming bitumen its volume is temporarily increased and, as a result of this, its viscosity is temporarily reduced. Consequently, the stone chippings to be mixed with bitumen as to produce asphalt have to be heated up less in order to ensure a complete wetting of the surfaces of the stone chippings. Accordingly, less fuel is required and hence also less $CO_2$ is produced.

For the today known methods of producing binder foam for asphalt production water is injected into a hot stream of pressurized bitumen. The mixture stream of bitumen and water created in this way is guided via foaming nozzles at atmospheric pressure, if necessary after it was previously passed through a pressurized mixer, wherein the bitumen is foamed by evaporating the water transported therein.

In these cases the quality of the bitumen produced with the known methods vary substantially.

In order to achieve a good wetting of the stone chippings during mixing and a long life of the asphalt, it is desired to use a strongly foamed binder foam with an as fine as possible bubble structure, because such a foam collapses only very slowly and in this way the binder has relatively long a reduced viscosity.

Today, such foam can only be produced with relatively complex methods, e.g. in case of which the mixture stream of bitumen and water has been guided through a static mixer for foaming. However, this results in a relatively high complexity in terms of installations, and the economic efficiency is negatively influenced by the necessity of frequent cleaning/maintenance of the mixer.

However, the desired foam quality cannot be reached by the today known simple methods which can be carried out with simple, inexpensive installations without mixing devices.

SUMMARY OF THE INVENTION

It is therefore the objective of the invention to provide methods and devices not having the disadvantages mentioned above or which avoid these at least partially.

This objective is reached by the subject matters of the independent claims.

Accordingly, a first aspect of the invention relates to a method for producing a binder foam, preferably for producing foam bitumen, for asphalt production. A stream of pressurized heated binder, e.g. bitumen, as well as a liquid, e.g. water, having a lower evaporation temperature under atmospheric pressure than the temperature of the provided heated binder stream, are provided as initial products. The liquid is injected under pressure into the binder stream via one or more nozzles at an angle greater than 90° with respect to the flow direction of the binder stream, such that a pressurized mixture stream of binder with liquid drops dispersed therein or with liquid drops dispersed therein and vapour bubbles resulting from said drops, respectively, is present downstream of the injection point. Further downstream the pressure of the mixture stream is reduced to such extent, preferably to atmospheric pressure, that foaming of the binder is generated as a result of evaporation of liquid drops contained therein and/or of expansion of the vapour bubbles generated from the liquid drops contained therein.

In other words the first aspect of the invention relates to a method for producing a binder foam for the production of asphalt, in case of which a liquid having a lower evaporation temperature under atmospheric pressure than the temperature of the provided heated binder stream, preferably water, is injected under pressure into a binder stream, preferably bitumen, at an angle greater than 90° with respect to the flow direction of the binder stream, such that a pressurized mixture stream of binder with liquid drops dispersed therein or with liquid drops dispersed therein and vapour bubbles resulting from said drops, respectively, is present downstream of the injection point. The pressure of this mixture stream is thereafter reduced, preferably to atmospheric pressure, with the result that foaming of the binder is generated as a result of evaporation of liquid drops contained therein and/or of expansion of the vapour bubbles generated from the liquid drops contained therein.

It has been noticed that high quality binder foams with fine bubble structure can be produced with the method according to the invention with small complexity in what concerns installations, such that, even in case of high requirements regarding foam quality, it is possible to avoid mechanic mixing devices, e.g. static mixers, for mixing the mixture stream of binder with liquid drops dispersed therein or with liquid drops dispersed therein and vapour bubbles resulting from said drops, respectively, which also corresponds to a preferred embodiment of the method according to the invention.

Preferably, the injection of the liquid into the binder stream is carried out at an angle greater than 120°, more preferred at an angle of 180°, with respect to the flow direction of the binder stream, i.e. in a direction oblique against or entirely against the flow direction of the binder stream.

It is also preferred that the injection of the liquid into the binder stream is done in the center of the binder stream.

By these measures a particularly good distribution of the liquid in the binder stream is reached, such that the foam quality can be further improved.

Advantageously, a liquid in which the binder is insoluble or only partly soluble is provided and injected. This results in the advantage that the entire injected liquid quantity or at least a majority of it can be used as blowing agent for foaming the binder.

In a preferred embodiment of the method the liquid is injected into the binder stream under a pressure which is greater than the pressure inside the binder stream at the injection point, preferably at least 1 bar greater than the pressure inside the binder stream at the injection point.

It is further preferred that the injection pressure of the liquid is adjusted in such a way that the injection speed of the liquid is at least double the flow speed of the binder stream in the area of the injection point.

It has been noticed that these measures favour formation of fine liquid drops in the binder stream and as a consequence make possible a further improvement of foam quality.

In a further preferred embodiment of the method the flow speed of the binder stream is adjusted in such a way that an elongational flow is present at least in a partial area of the binder stream, preferably in the area of the injection point and advantageously additionally at least in a certain partial area downstream of the injection point.

It is even more preferred that an elongational flow is present along a majority of the elongation or along the entire elongation of the binder stream between the injection point and the point where the pressure of the mixture stream is reduced for foaming the binder.

By generating an elongational flow it is possible to further separate the liquid drops carried by the binder stream after the injection point into smaller liquid drops, this being advantageous for a finer foam structure of the binder foam produced from the mixture stream.

Advantageously, in case of the method according to the invention, the elongation of the binder stream between the injection point and the point where the pressure of the mixture stream is reduced for foaming the binder is chosen in such a way that it corresponds to a multiple of, preferably between twenty five times and fifty times, the diameter or the hydraulic diameter, respectively, of the binder stream at the injection point. Such a dimensioning has been found to be particularly practical.

The reduction of pressure of the mixture stream of the binder with liquid drops dispersed therein or with liquid drops dispersed therein and vapour bubbles resulting from said drops, respectively, for foaming the binder stream, is preferably done via one or more, preferably identical, foaming nozzles, e.g. directly into an asphalt mixer. The usage of nozzles makes possible a continuous process and a controlled pressure reduction.

The injected liquid quantity per time unit preferably corresponds to 1 to 8 percent per volume, even more preferred 2 to 4 percent per volume, of the volume flow of the binder stream at the injection point. Such quantity ratios have been found to be particularly suitable in practice.

In yet a further preferred embodiment of the method the temperatures and pressures of the binder stream and of the injected liquid are chosen in such a way that a viscosity ratio between injected liquid and binder is greater than 0.5, preferably of around 1.0 at the injection point. In this way forming of finer liquid drops in the binder stream is favoured, adding up to a good foam quality.

In yet a further preferred embodiment of the method the temperatures of the binder stream and of the injected liquid as well as their quantity ratio are chosen in such a way that the theoretical mixing temperature of the mixture stream is at least 30%, preferably at least 50%, and more preferable at least 60% above the evaporation temperature of the liquid at atmospheric pressure for the case that the injected liquid drops remain in the liquid phase.

In yet a further preferred embodiment of the method the pressure in the mixture stream, between the injection point and the point where the pressure of the mixture stream is reduced for foaming the binder, is adjusted in such a way that the liquid drops contained in the mixture stream are liquid up to the latter point and evaporate only due to reduction of the pressure of the mixture stream for foaming the binder.

It has been noticed that a particularly good foaming effect can be attained by using the two latter method variants, particularly when the pressure of the mixture stream is reduced to atmospheric pressure.

Preferably bitumen, with or without additives, is used as binder for the method according to the invention and preferably water is used as liquid, also with or without additives. Such initial materials are established in the production of asphalt and have proven themselves for decades.

If a binder stream consisting substantially of bitumen is provided, it preferably has a temperature of at least 150° C. In case of such bitumen temperatures water with normal room temperature can be used as liquid, and a special water pre-heating can be avoided.

A second aspect of the invention relates to a method for producing asphalt. A binder foam, preferably a bitumen foam produced with the method according to the first aspect of the invention, is mixed with heated stone chippings and if necessary with further components.

A third aspect of the invention relates to an installation for carrying out the method according to first aspect of the invention. The installation has a flow channel being connected or connectable at a first of its two ends to an inlet for the binder, particularly bitumen, to be foamed, for generating a pressurized flow of heated binder in the flow channel in operation as intended. Furthermore, the installation comprises means for injecting a liquid, preferably water, into the stream of heated binder generated in the flow channel in operation as intended, in such a way that downstream of the injection point a pressurized mixture stream of binder with liquid drops dispersed therein or with liquid drops dispersed therein and vapour bubbles resulting from said drops, respectively, can be generated in the flow channel. The means for injecting the liquid are adapted to inject the liquid at an angle greater than 90° with respect to the flow direction of the flow of heated binder generated in the flow channel when operated as intended. In other words the means for injecting the liquid are therefore formed in such a way that the liquid can be injected in a direction oblique and/or against the flow direction of the heated binder generated in the flow channel when operated as intended.

Furthermore the installation comprises means for releasing the mixture stream of binder with liquid drops dispersed therein or with liquid drops dispersed therein and vapour bubbles, respectively, from the flow channel in the presence of a particularly abrupt decrease of the pressure of the mixture stream, advantageously to atmospheric pressure, such that foaming of the binder can be reached as a result of an evaporation of liquid drops contained therein and/or expansion of the vapour bubbles generated from the liquid drops. Preferably, the means for releasing the mixture stream from the flow channel for foaming the binder comprise one or more, preferably identical, foaming nozzles.

The installation according to the invention makes it possible to produce binder foams of high quality with fine bubble structure with a reduced complexity with respect to installations according to the method of the first aspect of the invention.

In a preferred embodiment of the installation the means for injecting the liquid are formed in such a way that the liquid can be injected into the stream at an angle greater than 120°, preferably at an angle of 180°, with respect to the flow direction of the flow of heated binder generated in the flow channel when operated as intended, i.e. in a direction oblique against or entirely against the flow direction of the binder stream, if operated as intended.

It is also preferred that the installation is formed in such a way that the injection of liquid into the binder stream is done in the center of the binder stream.

These measures allow a particularly good distribution of the liquid in the binder stream and an improvement of foam quality.

In a further preferred embodiment of the installation the latter doesn't have mechanic mixing devices, e.g. static mixers, between the means for injecting the liquid and the means for releasing the mixture stream from the flow channel for foaming the binder. Such installations are robust and secure in operation as well as inexpensive in terms of acquisition and maintenance.

The means according to the claims for injecting the liquid into the stream of heated binder generated in the flow channel when operated as intended are no mechanical mixing devices in the sense of the claims, even if they can influence the flow downstream of the injection point by deviation, by components like inlet pipes and/or supporting structures, particularly in case of injection angles greater than 90° and central injection.

In yet a further preferred embodiment of the installation the elongation of the flow channel between the injection point and the point where the pressure of the mixture stream is reduced for foaming the binder corresponds to a multiple of, preferably between twenty five times and fifty times, the diameter of the flow channel at the injection point. Such a dimensioning has been found to be particularly practicable for reaching high foam qualities.

A fourth aspect of the invention relates to a use of the installation according to the third aspect of the invention for producing foam bitumen. Such use of the installation is particularly preferred.

BRIEF DESCRIPTION OF THE DRAWINGS

Further embodiments, advantages and applications of the invention result from the dependent claims and from the following description and drawings.

DESCRIPTION OF THE PREFERRED EMBODIMENTS

Figure 1:
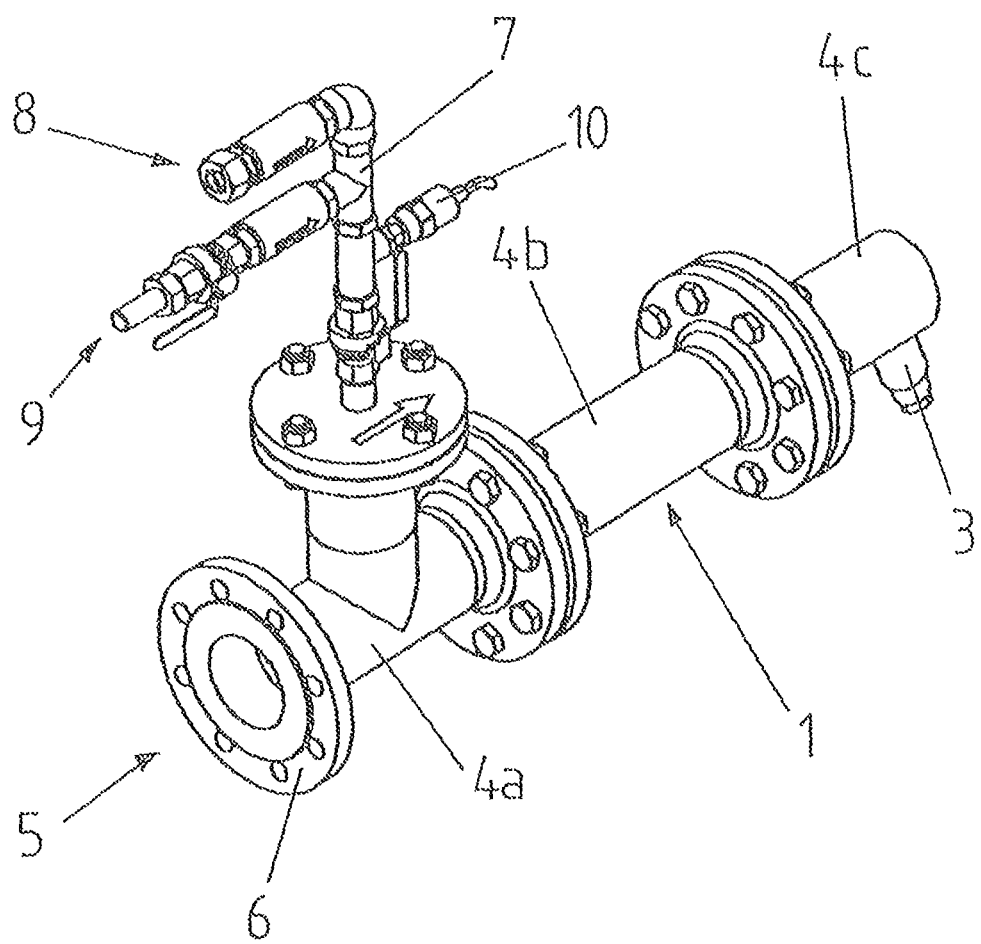
FIG. 1 is a perspective top view of an installation according to the invention.
Figure 2:
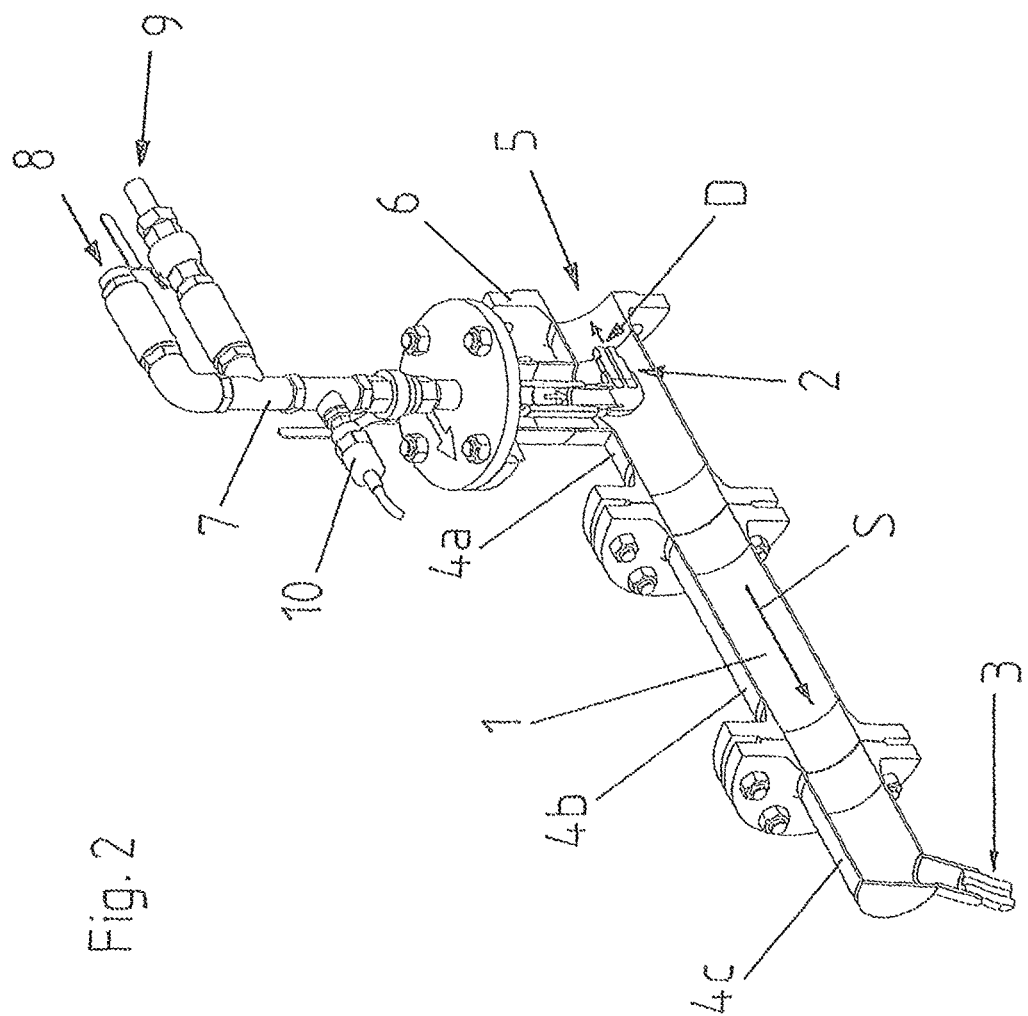
FIG. 2 is a perspective section view of the installation of FIG. 1.
Figure 3:
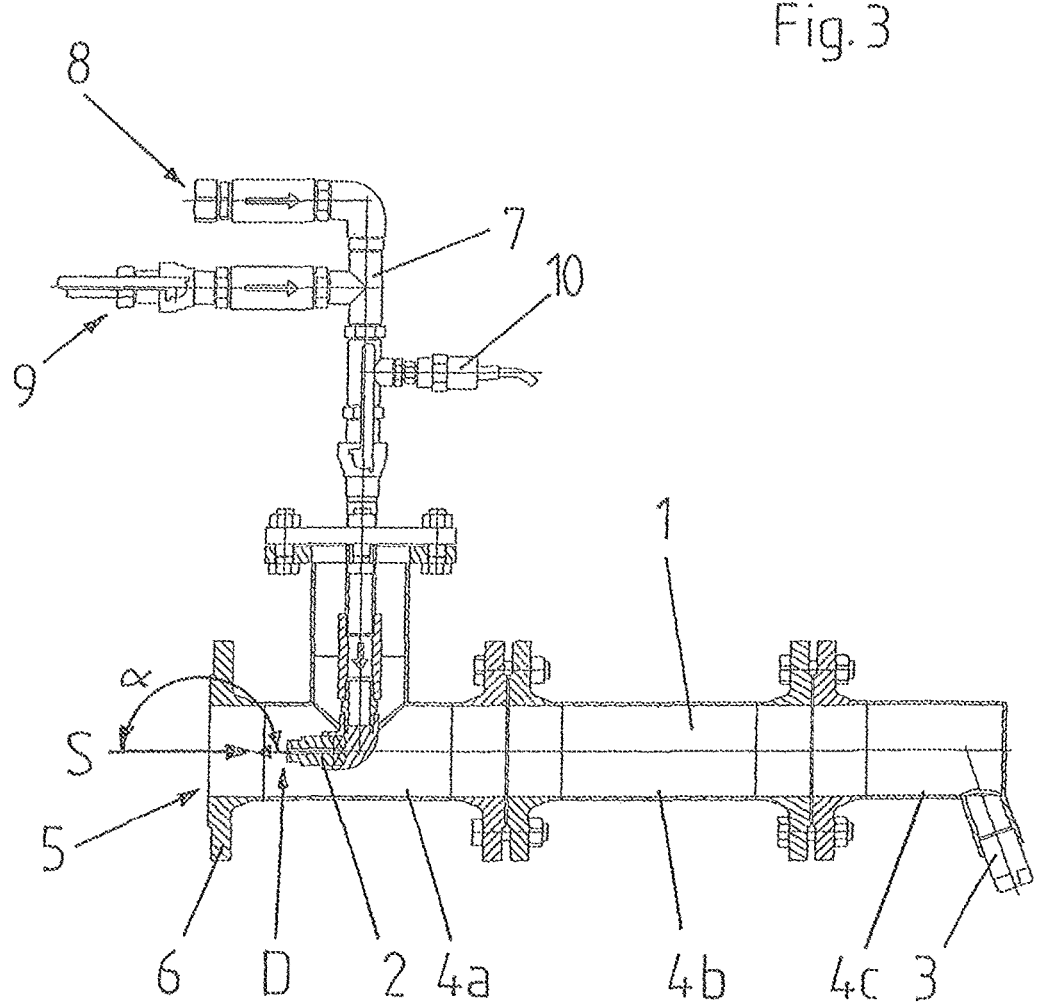
FIG. 3 is a longitudinal section view through the installation of FIG. 1.

FIGS. 1 to 3 show an installation according to the invention for carrying out the method according to the invention, once in a perspective top view (FIG. 1), once in a perspective section view (FIG. 2) and once in a longitudinal section view (FIG. 3).

As can be seen from a synopsis of these figures, the installation has a flow channel 1 formed by pipe sections 4a, 4b, 4c arranged one after the other and mutually connected by flange parts, wherein the flow channel has a flange 6 at its inlet end 5 (the first of its two ends according to the claims), which serves for coupling the flow channel 1 to an inlet pipe (not shown), when operated as intended, via which a pressurized stream of heated bitumen is supplied into the flow channel 1.

A nozzle 2 directed towards the inlet end 5 and which is connected to an inlet pipe 7, via which a pressurized water stream is supplied to the nozzle 2 in operation as intended, for injecting the water into the pressurized hot bitumen stream, is arranged in the center of the first pipe section 4a of the flow channel 1. The inlet pipe 7 has a water connection 8 for supplying pressurized water in operation as intended, a cleaning agent connection 9 for supplying cleaning agent, e.g. pressurized air, for cleaning the nozzle 2 after operation as intended, as well as a pressure sensor 10, by means of which the pressure in the inlet pipe 7 may be monitored. As particularly evident from FIG. 3, injection of water into the bitumen stream is done in operation as intended into the center of the flow channel 1 because of the arrangement and orientation of the nozzle 2, and therefore into the center of the bitumen stream guided therein, and at an angle α of 180° to the flow direction S into the stream of heated bitumen generated in the flow channel 1. By injecting the water into the bitumen stream, the result is, in operation as intended, a pressurized mixture stream of bitumen with water drops finely dispersed therein downstream of the injection point D.

A foam nozzle 3 is arranged at the end of the last pipe section 4c of the flow channel 1, via which the pressurized mixture stream of bitumen with water drops dispersed therein leaves the flow channel 1, in operation as intended, and is de-pressurized to atmospheric pressure, wherein it foams as a result of an evaporation of the water drops contained therein and/or of an expansion of the vapour bubbles resulting from the water drops.

As can further be seen in the figures, the installation has no mechanic mixing devices or flow obstacles between the nozzle 2 for injecting water into the bitumen stream and the foaming nozzle 3 for releasing the mixture stream of bitumen and injected water drops from the flow channel 1, but is formed as even, straight pipe.

While preferred embodiments of the invention are described in the present application, it is clearly noted that the invention is not limited thereto and may be carried out in other ways within the scope of the now following claims.

The invention claimed is:

1. Method for producing a binder foam for asphalt production comprising the steps:
   a) providing a pressurized stream of heated binder;
   b) providing a liquid having a lower evaporation temperature under atmospheric pressure than the temperature of the provided heated binder stream;
   c) injecting the liquid into the binder stream under pressure, such that a pressurized mixture stream of binder with liquid drops dispersed therein or with liquid drops dispersed therein and vapour bubbles resulting from said drops is present downstream of the injection point; and
   d) reducing the pressure of the mixture stream for foaming the binder as a result of an evaporation of liquid drops contained therein and/or expansion of the vapour bubbles generated from the liquid drops,
   wherein the injection of the liquid into the binder stream is carried out from a side of the heated binder stream at an angle (α) greater than 90° but no greater than 180° with respect to the flow direction (S) of the binder stream, so that the liquid is injected obliquely to or entirely against the stream flow.

2. Method according to claim 1, wherein the injection of the liquid into the binder stream is carried out at an angle (α) greater than 120° but no greater than 180° with respect to the flow direction (S) of the binder stream.

3. Method according to claim 1, wherein no mixing of the mixture stream by mechanic mixing devices is carried out between the injection of the liquid and the reduction of the pressure of the mixture stream for foaming the binder.

4. Method according to claim 1, wherein the injection of the liquid into the binder stream is done in the center of the binder stream.

5. Method according to claim 1, wherein a liquid in which the binder is insoluble or only partly soluble is provided and injected.

6. Method according to claim 1, wherein the liquid is injected into the binder stream under a pressure which is greater than the pressure inside the binder stream at the injection point (D).

7. Method according to claim 6, wherein the injection pressure of the liquid is adjusted in such a way that the injection speed of the liquid is at least double the flow speed of the binder stream in the area of the injection point (D).

8. Method according to claim 1, wherein the flow speed of the binder stream is adjusted in such a way that an elongational flow is present at least in a partial area of the binder stream.

9. Method according to claim 8, wherein the flow speed of the binder stream is adjusted in such a way that an elongational flow is present in a majority of the extension or in the entire extension of the binder stream between the injection point (D) and the point where the pressure of the mixture stream is reduced for foaming the binder.

10. Method according to claim 1, wherein the length of the binder stream between the injection point (D) and the point where the pressure of the mixture stream is reduced for foaming the binder is chosen in such a way that it corresponds to between twenty five times and fifty times the diameter of the binder stream at the injection point.

11. Method according to claim 1, wherein the reduction of the pressure of the mixture stream for foaming the binder stream is done via one or more foaming nozzles.

12. Method according to claim 1, wherein the injected liquid quantity corresponds to 1 to 8 percent per volume of the binder stream at the injection point (D).

13. Method according to claim 1, wherein the temperature and pressures of the binder stream and of the injected liquid are chosen in such a way that a viscosity ratio between injected liquid and binder is greater than 0.5 at the injection point (D).

14. Method according to claim 1, wherein the temperatures of the binder stream and of the injected liquid as well as their quantity ratio are chosen in such a way that the theoretical mixing temperature of the mixture stream is at least 30% above the evaporation temperature of the liquid at atmospheric pressure.

15. Method according to claim 1, wherein the pressure in the mixture stream, between the injection point (D) and the point where the pressure of the mixture stream is reduced for foaming the binder, is adjusted in such a way that the liquid drops contained in the mixture stream are liquid up to the latter point and evaporate only due to the reduction of the pressure of the mixture stream for foaming the binder.

16. Method according to claim 1, wherein bitumen is used as binder and water is used as liquid.

17. Method according to claim 1, wherein a binder stream consisting essentially of bitumen and having a temperature of at least 150° C. is provided.

18. Method for producing asphalt, wherein a binder foam produced with the method according to claim 1 is mixed with stone chippings.

* * * * *